(12) United States Patent
Lim et al.

(10) Patent No.: US 10,931,030 B2
(45) Date of Patent: Feb. 23, 2021

(54) CENTER FED OPEN ENDED WAVEGUIDE (OEWG) ANTENNA ARRAYS

(71) Applicant: Waymo LLC, Mountain View, CA (US)

(72) Inventors: Edwin Lim, Mountain View, CA (US); Jamal Izadian, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 8 days.

(21) Appl. No.: 16/567,176

(22) Filed: Sep. 11, 2019

(65) Prior Publication Data
US 2020/0203849 A1 Jun. 25, 2020

Related U.S. Application Data

(63) Continuation-in-part of application No. 16/230,702, filed on Dec. 21, 2018, now Pat. No. 10,811,778.

(51) Int. Cl.
| | |
|---|---|
| *H01Q 3/26* | (2006.01) |
| *H01Q 21/00* | (2006.01) |
| *G01S 7/285* | (2006.01) |
| *G01S 13/26* | (2006.01) |
| *H01P 5/12* | (2006.01) |

(52) U.S. Cl.
CPC ......... *H01Q 21/0037* (2013.01); *G01S 7/285* (2013.01); *G01S 13/26* (2013.01); *H01P 5/12* (2013.01)

(58) Field of Classification Search
CPC ........... H01Q 21/0037; H01Q 21/0025; H01Q 25/00; H01Q 3/26; H01Q 3/267; H01Q 3/2676; G01S 7/285; G01S 13/26; H01P 5/12

USPC ......................................................... 342/368
See application file for complete search history.

(56) References Cited

U.S. PATENT DOCUMENTS

| | | | | |
|---|---|---|---|---|
| 5,726,666 A | * | 3/1998 | Hoover ................. | H01Q 13/10 343/767 |
| 5,757,329 A | * | 5/1998 | Hoover ................. | H01Q 13/18 29/600 |
| 6,424,298 B1 | * | 7/2002 | Nishikawa .......... | H01Q 13/206 343/700 MS |

(Continued)

*Primary Examiner* — Harry K Liu
(74) *Attorney, Agent, or Firm* — McDonnell Boehnen Hulbert & Berghoff LLP

(57) ABSTRACT

Example radar systems are presented herein. A radar system may include radiating elements configured to radiate electromagnetic energy and arranged symmetrically in a linear array. The radiating elements comprise a set of radiating doublets and a set of radiating singlets. The radar system also includes waveguide configured to guide electromagnetic energy between each of the plurality of radiating elements and a waveguide feed. The waveguide feed is coupled to the second side of the waveguide at a center location between a first half of the plurality of radiating elements and a second half of the plurality of radiating elements. The waveguide feed is configured to transfer electromagnetic energy between the waveguide and a component external to the waveguides. The radar system may also include a power dividing network defined by the waveguide and configured to divide the electromagnetic energy transferred by the waveguide feed based on a taper profile.

20 Claims, 11 Drawing Sheets

(56) References Cited

U.S. PATENT DOCUMENTS 6,972,727 B1 * 12/2005 West ................. H01P 1/181
   333/157
9,979,094 B1 * 5/2018 Izadian ................ H01Q 3/28

* cited by examiner

CENTER FED OPEN ENDED WAVEGUIDE (OEWG) ANTENNA ARRAYS

CROSS REFERENCE TO RELATED APPLICATION

The present patent application is a continuation-in-part of U.S. patent application Ser. No. 16/230,702, filed on Dec. 21, 2018, which is hereby incorporated by reference in its entirety.

BACKGROUND

Radio detection and ranging (RADAR) systems can be used to actively estimate distances to environmental features by emitting radio signals and detecting returning reflected signals. Distances to radio-reflective features can be determined according to the time delay between transmission and reception. A radar system can emit a signal that varies in frequency over time, such as a signal with a time-varying frequency ramp. The radar system can then relate the difference in frequency between the emitted signal and the reflected signal in order to derive a range estimate of the object or surface that reflected the emitted signal.

Some radar systems may also estimate relative motion of reflective objects based on Doppler frequency shifts in the received reflected signals. In addition, a radar system may incorporate directional antennas for the transmission and/or reception of signals in order to associate each range estimate with a bearing. The directional antennas can also be used to focus radiated energy on a given field of view of interest enabling the surrounding environment features to be mapped using the radar system.

SUMMARY

In one aspect, the present application describes a system. The system may include a plurality of radiating elements configured to radiate electromagnetic energy and arranged in a linear array. The system also includes a waveguide feed and a waveguide configured to guide electromagnetic energy between (i) each of the plurality of radiating elements and (ii) the waveguide feed. The waveguide comprises a first side and a second side opposite the first side, where the radiating elements are coupled to the first side of the waveguide. The waveguide feed is coupled to the second side of the waveguide at a center location between a first half of the plurality of radiating elements and a second half of the plurality of radiating elements. The waveguide feed is configured to transfer electromagnetic energy between the waveguide and a component external to the waveguide.

In another aspect, the present application describes a method. The method may involve feeding electromagnetic energy to a center of a waveguide by a waveguide feed. The waveguide comprises a first side and a second side opposite of the first side. The method may further involve propagating electromagnetic energy via the waveguide between (i) each of a plurality of radiating elements and (ii) the waveguide feed. The plurality of radiating elements is arranged in a linear array and coupled to the first side of the waveguide. The method also includes, for each radiating element, providing a portion of the propagating electromagnetic energy and radiating at least a portion of the propagating electromagnetic energy via each radiating element.

In yet another aspect, the present application describes a radar system. The radar system includes a plurality of radiating elements configured to radiate electromagnetic energy and arranged in a linear array. The plurality of radiating elements comprises a set of radiating doublets and a set of radiating singlets. The radar system further includes a waveguide feed and a waveguide configured to guide electromagnetic energy between (i) each of the plurality of radiating elements and (ii) the waveguide feed. The waveguide comprises a first side and a second side opposite the first side, where the plurality of radiating elements is coupled to the first side of the waveguide. The waveguide feed is coupled to the second side of the waveguide at a center location between a first half of the plurality of radiating elements and a second half of the plurality of radiating elements. The waveguide feed is configured to transfer electromagnetic energy between the waveguide and a component external to the waveguide.

In still another aspect, a system is provided that includes means for radiating electromagnetic energy. The system includes means for feeding electromagnetic energy to a center of a waveguide by a waveguide feed. The waveguide comprises a first side and a second side opposite of the first side. The system further includes means for propagating electromagnetic energy via the waveguide between (i) each of a plurality of radiating elements and (ii) the waveguide feed. The plurality of radiating elements is arranged in a linear array coupled to the first side of the waveguide. The system includes means for providing a portion of the propagating electromagnetic energy for each radiating element. The system also includes means for radiating at least a portion of the propagating electromagnetic energy via each radiating element.

In another aspect, the present application describes an antenna system. The antenna system includes a first layer having a first portion of a feed waveguide coupled to a feed port. The antenna system also includes a second layer having a second portion of the feed waveguide and a first portion of a waveguide. The first portion of the feed waveguide is coupled to the second portion of the feed waveguide such that the feed waveguide causes propagation of electromagnetic energy in a direction parallel to a seam between the first layer and the second layer. In addition, the second portion of the feed waveguide is coupled to the first portion of the waveguide at a coupling point. The antenna system further includes a third layer having a second portion of the waveguide and a set of radiating elements arranged in a linear array. Each radiating element is coupled to the second portion of the waveguide, and wherein the coupling point aligns with a center of the linear array.

In a further aspect, the present application describes another method of radiating radar. The method involves feeding, at an antenna system, electromagnetic energy to a center of a waveguide by a feed waveguide. A first layer of the antenna system includes a first portion of the feed waveguide coupled to a feed port. The method further involves propagating electromagnetic energy via the waveguide between (i) the feed waveguide and (ii) each of a set of radiating elements arranged in a linear array. A second layer of the antenna system includes a second portion of the feed waveguide and a first portion of the waveguide. Particularly, the first portion of the feed waveguide is coupled to the second portion of the feed waveguide such that the feed waveguide causes propagation of electromagnetic energy in a direction parallel to a seam between the first layer and the second layer. In addition, the second portion of the feed waveguide is coupled to the first portion of the waveguide at a coupling point. The method also involves, for each radiating element, providing a portion of the propagating electromagnetic energy. A third layer of the antenna system includes a second portion of the waveguide and the set of radiating elements arranged in the linear array. Each radiating element is coupled to the second portion of the waveguide and the coupling point aligns with a center of the linear array. The method further involves radiating at least a portion of the propagating electromagnetic energy via each radiating element.

The foregoing summary is illustrative only and is not intended to be in any way limiting. In addition to the illustrative aspects, embodiments, and features described above, further aspects, embodiments, and features will become apparent by reference to the figures and the following detailed description.

Figure 1A:
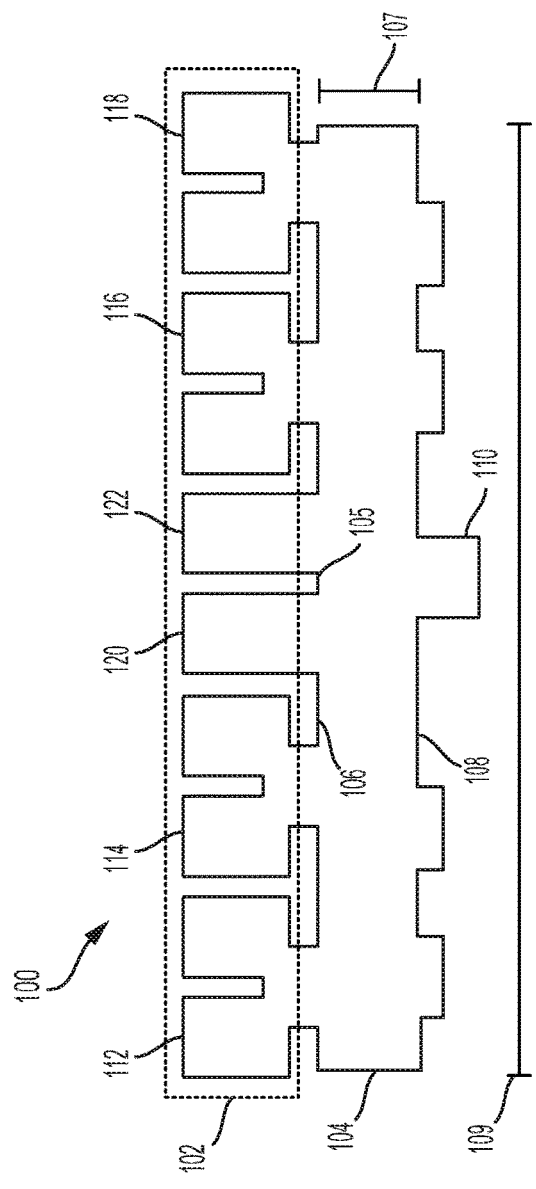
FIG. 1A illustrates a first configuration of an antenna, in accordance with example embodiments.

DETAILED DESCRIPTION in the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system may operate at an electromagnetic wave frequency in the W-Band, for example 77 Giga-Hertz (GHz), resulting in millimeter (mm) electromagnetic wave length (e.g., 3.9 mm for 77 GHz). The radar system may use one or more antennas to focus radiated energy into tight beams to measure a nearby environment. The measurements can be captured with high precision and accuracy. For instance, the radar system a capture measurements of the environment around an autonomous vehicle. Such antennas may be compact (typically with rectangular form factors), efficient (i.e., there should be little energy lost to heat in the antenna, or reflected back into the transmitter electronics), and inexpensive and easy to manufacture.

Efficiency can be difficult to achieve in inexpensive, easy to manufacture radar systems. Some inexpensive and easy to manufacture options involve integrating an antenna onto a circuit board (e.g., with a "series-fed patch antenna array). This antenna configuration, however, might lose energy due to the substrate of the circuit board absorbing energy. One technique often used to reduce energy loss involves constructing an antenna using an all-metal design. Conventional all-metal antenna designs (e.g., slotted waveguide arrays), however, might be difficult to manufacture in a manner that incorporates minimal geometries needed to enable 77 GHz operation.

The following detailed description discloses example "open-ended waveguide" (OEWG) antennas for a radar system and methods for fabricating such antennas. The radar system may operate for an autonomous vehicle or another type of navigating entity. In some examples, the term "OEWG" may refer herein to a short section of a horizontal waveguide channel plus a vertical channel. The vertical channel may split into two parts, where each of the two parts of the vertical channel includes an output port configured to radiate at least a portion of electromagnetic waves that enter the antenna. This configuration may be a dual open-ended waveguide. In other examples, the vertical channel itself may form the output as a single element.

An example OEWG antenna may be generated using two or more metal layers (e.g., aluminum plates) machined with computer numerical control (CNC), aligned properly, and joined together. The first metal layer may include a first half of an input waveguide channel. As such, the first half of the first waveguide channel may further include an input port that may be configured to receive electromagnetic waves (e.g., 77 GHz millimeter waves) into the first waveguide channel.

The first metal layer may also include a first half of a plurality of wave-dividing channels. The wave-dividing channels may include a network of channels that branch out from the input waveguide channel and configured to receive electromagnetic waves from the input waveguide channel, divide the electromagnetic waves into portions of electromagnetic waves (i.e., power dividers), and propagate the portions of electromagnetic waves to wave-radiating channels. As such, the two metal layer configuration may be called a split block construction.

The first metal layer may be configured with a first half of the wave-radiating channels that are configured to receive portions of electromagnetic waves from wave-dividing channels. The first halves of the wave-radiating channels include at least one wave-directing member configured to propagate sub-portions of electromagnetic waves to another metal layer.

Moreover, the second metal layer making up the antenna may include second halves of the input waveguide channel, the wave-dividing channels, and the wave-radiating channels. The second halves of the wave-radiating channels may include one or more output ports partially aligned with one or more one wave-directing members. Each wave-directing member may be configured to radiate sub-portions of electromagnetic waves propagated from the one or more wave-directing members out of the second metal layer. As such, a combination of a given wave-directing member with a corresponding pair of output ports may take the form of (and may be referred to herein as) a OEWG, as described above.

While in this particular example the antenna includes multiple wave-dividing channels and multiple wave-radiating channels, in other examples the antenna may include, at a minimum, only a single channel configured to propagate all the electromagnetic waves received by the input port to one or more wave-radiating channels. For instance, all or a portion of the electromagnetic waves may be radiated out of the second metal layer by a single OEWG. Other examples are possible as well.

The antenna may further include a waveguide feed coupled on the opposite side of the waveguide from the element feeds for each of the radiating elements. For instance, the element feed or feeds may be located on the top of the waveguide and the waveguide feed may be located on the bottom of the waveguide. During operation of the waveguide in a transmission mode, the waveguide feed may provide electromagnetic energy to the waveguide for transmission by the radiating elements. Conversely, during operation of the waveguide in a reception mode, the waveguide feed may be configured to couple electromagnetic energy received from the radiating elements outside of the feed waveguide.

The waveguide feed may be located at a position along the length of the feed waveguide. For example, in traditional waveguide systems, electromagnetic energy may be fed at one of the ends of the length of the waveguide in a direction corresponding to the length of the waveguide. By feeding a waveguide at the end, power division to achieve the taper profile (i.e., the desired phase and power amplitude for each radiating element) may be more difficult. As disclosed herein, the waveguide can instead be fed from the bottom of the waveguide, in a direction orthogonal to the direction of the length of the waveguide that feeds the radiating elements in some examples. Further, by feeding the waveguide from the bottom at a point along the length, it may be easier to design the power splitting network for the system.

In some embodiments, the waveguide feed is coupled to a side of the waveguide along the length dimension of the waveguide. Particularly, the waveguide may be positioned at a center location between a first half of the radiating elements and a second half of the radiating elements. The first half and second half of the radiating elements may be arranged symmetrically in a linear array on the side of the waveguide opposite of the waveguide feed. Symmetrically may indicate that the first half of the radiating elements and the second half of radiating elements mirror each other (i.e., have a uniform arrangement) starting from a center of the linear array. For instance, each half of the linear array may include the same number of radiating elements and the same type of radiating elements.

When multiple types of radiating elements make up the linear array (e.g., radiating singlets and radiating doublets), the symmetry of the linear array may exist with the first half of the linear array and the second half of the linear array having the same configuration extending away from a center of the linear array. For instance, a linear array may include radiating singlets on both ends and four radiating doublets positioned in between the radiating singlets. As such, the symmetry exists with a first half having a first radiating singlet on the end and two radiating doublets and a second half having a second radiating singlet on the opposite end and two radiating doublets as well. In other examples, each half of the radiating elements may not be symmetrical.

As indicated above, some embodiments may involve the waveguide feed coupled to the waveguide at a center position such that the waveguide feed aligns with a center of the linear array of radiating elements. As such, when the waveguide feed is positioned at a center location in the middle of the radiating elements, the waveguide feed may feed electromagnetic waves to the radiating elements in a common phase regardless of frequency. In turn, the antennas can be created to operate with a wider bandwidth of operation reducing phase issues. In addition, the antennas may also operate with less energy loss.

In some examples, the waveguide feed is positioned to the waveguide in between two sets of radiating doublets and two radiating singlets. The sets of radiating doublets and radiating singlets may be arranged symmetrically in a linear array. For instance, the waveguide feed may be positioned in between a first half of radiating elements consisting of two radiating doublets and a first singlet and a second half of radiating elements consisting of two radiating doublets and a second singlet. The singlets of each half of radiating elements may be positioned at the center of the linear array in between such that two radiating doublets are outside each side of the singlets. In other examples, the singlets may be positioned on the ends of the linear array. As such, the radiating doublets and the radiating singlets may operate with a common phase regardless of frequency. Additionally, in some examples, the waveguide and radiating elements may be symmetric around the central location of the waveguide feed.

In some embodiments, the two or more metal layers making up an antenna may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure provides an integrated power divider and method by which each waveguide that feeds a plurality of radiating elements of a OEWG may have its associated amplitude is adjusted. The amplitude may be adjusted based on a predefined taper profile that specifies a relative phase and power for each respective radiating element. Additionally, the present OEWG may be implemented with a simplified manufacturing process. For example, a CNC machining process or a metal-coated injection molding process may be implemented to make the above-described adjustments in parameters such as height, depth, multiplicity of step-up or step-down phase adjustment components, etc. Yet further, the present disclosure may enable a much more accurate method of synthesizing a desired amplitude and phase to cause a realized gain, side lobe levels, and beam steering for the antenna apparatus, as compared to other types of designs.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of a OEWG antenna to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

In practice, for the transmission of radar signals, the present antenna may receive a signal at a port on the bottom of a waveguide block. The signal may be evenly split between two different portions of a feed waveguide. The two different portions of the feed waveguide may be symmetric to one another about a plane centered on the port. Within each portion of the feed waveguide, the respective split signal may propagate along the respective portion of the waveguide. At each of a plurality of antenna feeds coupled to the respective feed waveguide portions, a portion of the signal may be coupled into the feed for transmission by antennas. During the operation of the antenna, the frequency of operation of the signal may vary. As the frequency varies, each respective set of antennas coupled to a respective feed waveguide section may have an associated beam squint, that is an undesired tilt of the transmitted beam. However, because there are two waveguides that are commonly fed at a center, the two beam squints may be of the same magnitude but in opposite directions. Therefore, the superposition of the two beams may cause an overall beam pattern to be in the desired direction, as the two beam squints offset one another. Similarly, the antenna may operate in a similar manner when receiving signals (i.e., two beam squints may offset one another).

Referring now to the figures, FIG. 1A illustrates a first configuration of an antenna. As shown in the first configuration, the antenna 100 includes a set of radiating elements 102, a waveguide 104, and a waveguide feed 110. In other configurations, the antenna 100 may include more or fewer elements.

The set of radiating elements 102 are shown with the radiating elements arranged symmetrically in a linear array. Each radiating element is configured to radiate electromagnetic energy. For instance, the set of radiating elements 102 may receive electromagnetic energy from the waveguide 104 and radiate the electromagnetic energy as radar signals into the environment. The radiating elements 102 may also receive reflected signals that reflected off surfaces in the environment and back towards the antenna 100.

The waveguide 104 is configured to guide electromagnetic energy between the set of radiating elements 102 and the waveguide feed 110. As shown FIG. 1A, the waveguide 104 includes a first side 106 and a second side 108 opposite the first side 106. Particularly, the first side 106 and the second side 108 are orthogonal to a height dimension 107 of the waveguide 104 and parallel to a length dimension 109 of the waveguide 104. As such, the set of radiating elements 102 is coupled to the first side 106 of the waveguide 104.

The waveguide feed 110 is shown coupled to the second side 108 of the waveguide 104 along the length dimension 109 of the waveguide 104. In particular, the waveguide feed 110 is coupled at a center location between a first half of the set of radiating elements 102 and a second half of the set of radiating elements 102. As such, the waveguide feed 110 may be aligned orthogonally to the length of the waveguide 104.

During operation of the antenna 100, the waveguide feed 110 is configured to transfer electromagnetic energy between the waveguide 104 and a component external to the waveguide (e.g., a radar chipset that provides and receives radar signals in the form of electromagnetic energy). In some embodiments, the waveguide feed 110 may serve to direct energy one way from the external component to the waveguide 104. In other embodiments, the waveguide feed 110 is configured to serve as a two-way component that can direct energy both ways between the waveguide 104 and the external component. For example, the waveguide feed 110 may be coupled to a beamforming network. The beamforming network may couple to multiple waveguides (e.g., the waveguide 104) and each waveguide may further link to a set of radiating elements. Therefore, in some examples, multiple sets of radiating elements 102 may form a two-dimensional array and a single feed 110 may provide electromagnetic energy for a plurality of waveguides, like waveguide 104, that each have a set of radiating elements 102 coupled thereto.

In some examples, the waveguide feed 110 may couple to the waveguide 104 at a junction. Particularly, the junction may be configured to divide power based on geometry of the waveguide feed 110 and the waveguide 104. Additionally, the junction may include a power-dividing component 105 (or power divider 156 of FIG. 1B) The power-dividing component 105 may function to split power from the waveguide feed 110 evenly between a left half of the waveguide 104 and the right half of the waveguide 104.

The antenna 100 is shown with radiating doublets and radiating singlets within the set of radiating elements 102. In some other examples (not shown), all the antenna elements may be created with radiating doublets. Starting from a first end of the linear array, radiating doublet 112 is positioned on the first end and followed by radiating doublet 114, a first radiating singlet 120, a second radiating singlet 122, radiating doublet 116, and radiating doublet 118 positioned on the second end. In the first configuration shown in FIG. 1A, the radiating singlets 120, 122 are positioned together proximate a center of the linear array such a first set of radiating doublets (i.e., radiating doublets 112, 114) is positioned outside the first radiating singlet 120 and a second set of radiating doublets (i.e., radiating doublets 116, 118) is positioned outside the second radiating singlet 122. As such, the arrangement of the first half of radiating elements mirrors the arrangement of the second half of radiating elements when viewed from the center of the linear array. The mirroring arrangements of the halves of radiating elements establish the symmetry of radiating elements within the linear array.

By having the radiating elements in a symmetrical arrangement, the antenna system may achieve several benefits. First, by making the antenna symmetrical, the antenna may designed in a more simple manner. Second, the antenna's performance may be improved if the feed is located at a symmetrical point. When the antenna is symmetric about the feed, it may have desirable broadband properties. For example, when a conventional end-fed waveguide antenna is fed with a signal of a frequency other than the exact design frequency, the antenna may suffer from beam squint. Beam squint is when the phase of the signal for transmission is mismatched from the exact design criteria. Beam squint causes the transmission beam to have a deviation from the designed transmission direction. By feeding the antenna in the center, the array functionally acts like two end-fed arrays that are fed with a common signal, but from opposite ends. Rather than have a beam squint, the present antenna may have a beam widening or narrowing as the frequency of operation changes.

The center positioning of the radiating singlets 120, 122 within the linear array may enable each singlet to transmit with more electromagnetic energy received through the waveguide 104 from the waveguide feed 110. The proximate positioning of the radiating singlets 120, 122 relative to the waveguide feed 110 may enable more electromagnetic energy to enter and transmit through each radiating singlet. This arrangement with singlets in the center may be desirable in antennas where the taper profile specifies that the center elements of an array, here radiating singlets 120, 122, transmit electromagnetic signals with a larger relative amplitude from the other radiating elements of the array.

In some embodiments, the antenna 100 may include dips under waveguide 108 and relative to the waveguide feed 110 that can assist with directing energy towards various radiating elements. The dips may differ in structure, design, and placement within examples. Further, the antenna 100 may not include the dips at all in other embodiments.

The antenna 100 may further include components not shown in FIG. 1A. For instance, the antenna 100 may include a power dividing network defined by the waveguide 104 and configured to divide the electromagnetic energy transferred by the waveguide feed 110 based on a taper profile. Each radiating element may receive a portion of the electromagnetic energy based on the taper profile. In some examples, the power dividing network may unevenly divide the power from the waveguide feed 110. In other examples, the power dividing network may evenly divide the power from the waveguide feed 110.

Figure 1B:
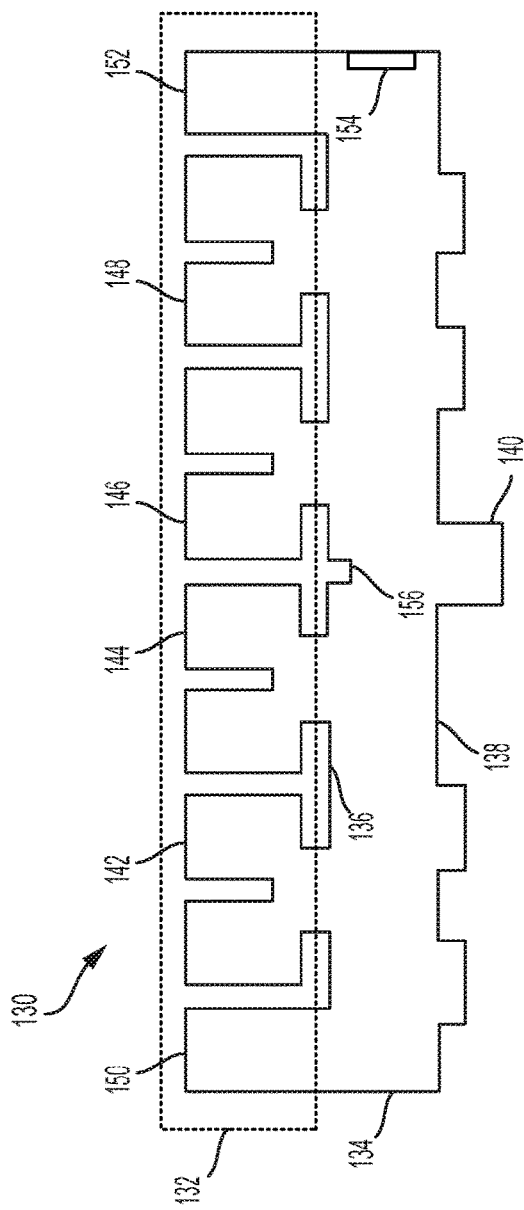
FIG. 1B illustrates a second configuration of an antenna, in accordance with example embodiments.

FIG. 1B illustrates a second configuration of an antenna. Similar to the antenna 100 in the first configuration, the antenna 130 shown in the second configuration includes a set of radiating elements 132, a waveguide 134, and a waveguide feed 140. In other configurations, the antenna 100 may include more or fewer elements.

In the second configuration, the set of radiating elements 132 of the antenna 130 includes a first radiating singlet 150 and a second radiating singlet 152 positioned on the ends of the linear array of radiating elements. Particularly, the first radiating singlet 150 is positioned outside of a first set of radiating doublets (i.e., radiating doublets 142, 144) at a first end of the linear array and the second radiating singlet 152 is positioned outside of a second set of radiating doublets (i.e., radiating doublets 146, 148) at a second end of the linear array. This arrangement with singlets at the ends of the array may be desirable in antennas based on a given taper profile. In other examples that are not shown, doublets and singlets may be combined in other ways as well.

Figure 1C:
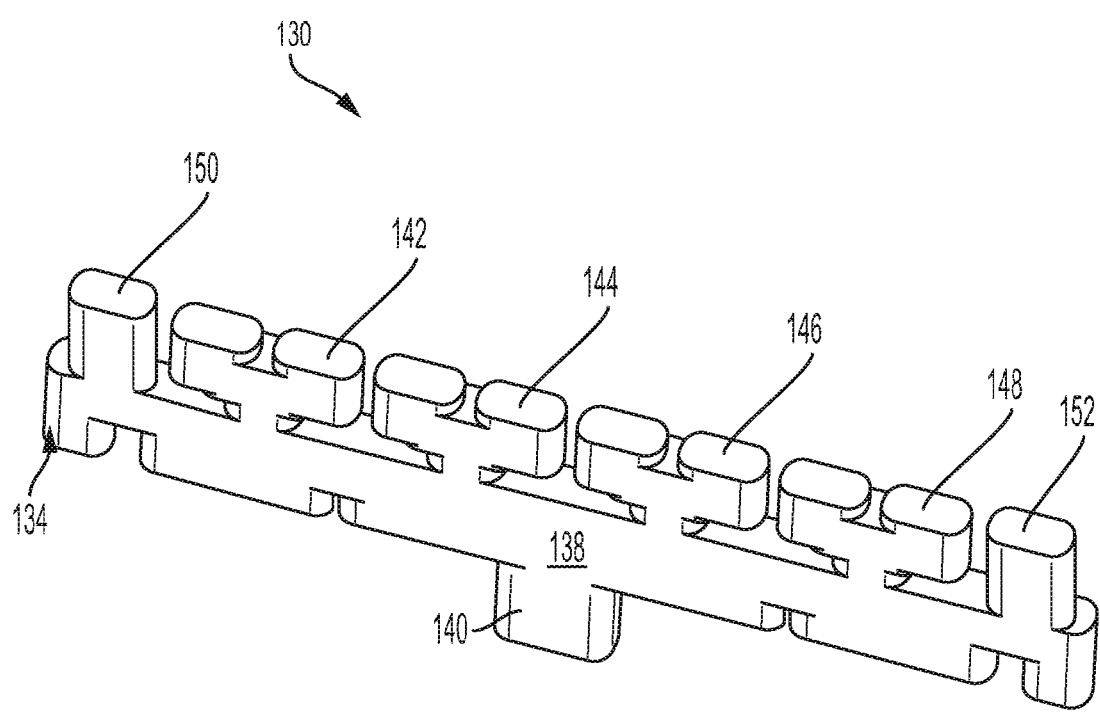
FIG. 1C illustrates a three-dimensional rendering of the second configuration of the antenna shown in FIG. 1B, in accordance with example embodiments.

FIG. 1C illustrates a three-dimensional rendering of the second configuration of the antenna shown in FIG. 1B. As shown in the second configuration, the antenna 130 includes a set of radiating elements, a waveguide 134, and a waveguide feed 140. The radiating elements includes a first radiating singlet 150 and a second radiating singlet 152 positioned on opposite ends of the linear array. The antenna 130 further includes radiating doublets 142, 144, 146, 148 positioned in between the radiating singlets 150, 152. As indicated above, the second configuration may be desirable to enable particular operation by the antenna 130 with respect to a taper profile.

The waveguide 134 may be configured in a similar manner as the waveguides discussed throughout this disclosure. For example, the waveguide 134 may include various shapes and structures configured to direct electromagnetic power to the various radiating elements (e.g., radiating singlets 150, 152 and radiating doublets 142, 144, 146, 148) of waveguide 134. Particularly, a portion of electromagnetic waves propagating through waveguide 134 may be divided and directed by various recessed wave-directing members and raised wave-directing members.

The pattern of wave-directing members shown in FIG. 1C is one example for the wave-directing members. Based on the specific implementation, the wave-directing members may have different sizes, shapes, and locations. Additionally, the waveguide may be designed to have the waveguide ends to be tuned shorts. For example, the geometry of the ends of the waveguides may be adjusted so the waveguide ends act as tuned shorts to prevent reflections of electromagnetic energy within the waveguide 134.

As on example, as shown in FIG. 1A, the ends of the waveguide 104 may have end portions that are approximately quarter of a wavelength long. Similarly, the waveguide 134 of FIG. 1B may include tuned shorts 154 at the ends of the waveguide. In some examples, when an electromagnetic wave reflects off the metallic ends of the waveguide (waveguide 104 or waveguide 134), it may be reflected 180 degrees out of phase. This 180 degree phase shift combined with double the length of the tuned shorts (i.e., ¼ of a wavelength of the tuned short, doubled due to inward and outward propagation), causes the reflected energy to be in phase with the energy in the waveguide.

At each junction of respective radiating elements of the waveguide 134, the junction may be considered a two way power divider. A percentage of the electromagnetic power may couple into the neck of the respective radiating elements and the remaining electromagnetic power may continue to propagate down the waveguide 134. By adjusting the various parameters neck width, heights, and steps) of each respective radiating element, the respective percentage of the electromagnetic power may be controlled. Thus, the geometry of each respective radiating element may be controlled in order to achieve the desired power taper. Thus, by adjusting the geometry of each of the offset feed and each respective radiating element, the desired phase and power taper for a respective waveguide and its associated radiating elements may be achieved.

When the system is being used in a transmission mode, electromagnetic energy may be injected into the waveguide 134 via the waveguide feed 140. The waveguide feed 140 may be a port (i.e. a through hole) in a bottom metal layer. The waveguide feed 140 may serve as a linking waveguide that enables electromagnetic energy to transfer into the waveguide 134.

As such, an electromagnetic signal may be coupled from outside the antenna unit into the waveguide 134 through the waveguide feed 140. The electromagnetic signal may come from a component located outside the antenna unit, such as a printed circuit board, another waveguide, a radar chip, or other signal source. In some examples, the waveguide feed 140 may be coupled to another dividing network of waveguides.

When the system is being used in a reception mode, the various radiating elements may be configured to receive electromagnetic energy from the outside world. In these examples, the waveguide feed 140 may be used to remove electromagnetic energy from the waveguide 134. When electromagnetic energy is removed from the waveguide 134, it may be coupled into components (e.g., one or more radar chips) for further processing.

In many traditional examples, a waveguide feed is located at the end of a waveguide. In the example shown in FIG. 1C, the waveguide feed 140 is located at a center location that aligns with a center of the symmetrical linear array of radiating elements. By centrally locating the waveguide feed 140, the electromagnetic energy that couples into the waveguide 134 may be divided more easily. Further, by locating the waveguide feed 140 at a central position, an antenna unit may be designed in a more compact manner.

When electromagnetic energy enters the waveguide 134 from the waveguide feed 140, the electromagnetic energy may be split in order to achieve a desired radiation pattern. For example, it may be desirable for each of a series of radiating elements in the linear array to receive a predetermined percentage of the electromagnetic energy from the waveguide 134. The waveguide may include a power dividing element (not shown) that is configured to split the electromagnetic energy that travels down each side of the waveguide.

In some examples, the power dividing element may cause the power to be divided evenly or unevenly between radiating elements. The radiating elements may be configured to radiate the electromagnetic energy upon reception of a portion of the electromagnetic energy. In some examples, each radiating element may receive approximately the same percentage of the electromagnetic energy as each other radiating element. In other examples, each radiating element may receive a percentage of the electromagnetic energy based on a taper profile that specifies a percentage of the energy to be radiated by each doublet or antenna element.

In some example taper profiles, the radiating elements of the antenna 130 that are located closer to the center of waveguide 138 relative to the waveguide feed 140 may receive a higher percentage of the electromagnetic energy. In some embodiments, the antenna 130 may include dips under waveguide 138 and relative to the waveguide feed 140 that can assist with directing energy towards various radiating elements. The dips may differ in structure, design, and placement within examples. Further, the antenna 130 may not include the dips at all in other embodiments. If electromagnetic energy is injected into the end of the waveguide 138, it may be more difficult to design the waveguide 138 to correctly split power between the various radiating elements. By locating the waveguide feed 140 at the central position, a more natural power division between the various radiating elements may be achieved.

In some examples, the radiating elements may have an associated taper profile that specifies the radiating elements in the center should receive a higher percentage of the electromagnetic energy than the other elements. Because the waveguide feed 140 is located closer to the center elements, it may be more natural to divide power with elements closest to the waveguide feed 140 receiving higher power. Further, if the waveguide 138 has the waveguide feed 140 located at the center of the waveguide 138, the waveguide 138 may be designed in a symmetrical manner to achieve the desired power division.

In some examples, the antenna 130 may operate in one of two modes. In the first mode, the antenna 130 may receive electromagnetic energy from a source for transmission (i.e. operate as a transmission antenna). In the second mode, the antenna 130 may receive electromagnetic energy from outside of the antenna 130 for processing (i.e. operate as a reception antenna).

Figure 2A:
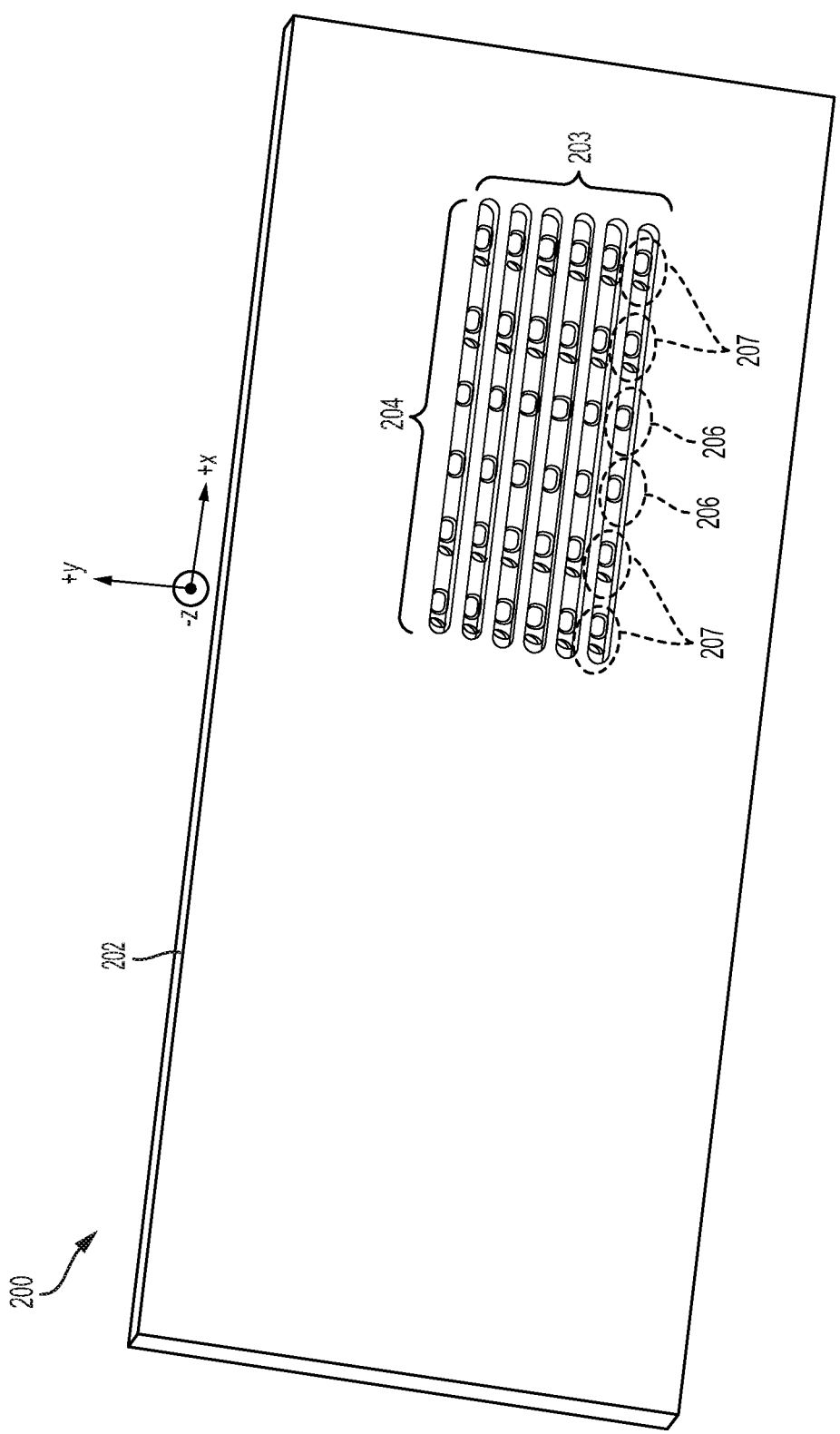
FIG. 2A illustrates a first layer of an antenna, in accordance with example embodiments.

FIG. 2A illustrates a first layer 202 of an antenna 200 that forms a two dimensional array of antenna elements. As shown, the first layer 202 includes a first half of a set of waveguide channels 203. The waveguide channels 203 may include multiple elongated segments 204, each of which corresponds to one or more waveguides. As such, at a first end of each elongated segment 204 may be one or more radiating singlets 206 and radiating doublets 207. Each radiating singlet 206 and radiating doublet 207 may have similar sizes or different sizes within examples.

Power may be used to feed a corresponding amount of electromagnetic waves (i.e., energy) into the antenna 200 with one or more through-holes that may be the location where these waves are fed into the apparatus. In line with the description above, the single channel/segment of the waveguide channels 203 that includes the input port may be referred to herein as an input waveguide channel.

Upon entering the antenna 200, electromagnetic waves may generally travel in both the +x and −x directions, as the feed couples electromagnetic energy into a center of the waveguides with respect to the x direction. The array may function to divide up the electromagnetic waves and propagate respective portions of the waves to respective first ends of each elongated segment 204. More specifically, the waves may continue to propagate in the +x and −x directions after leaving the array toward the radiating singlets 206 and radiating doublets 207. In line with the description above, the array section of the waveguide channels may be referred to herein as wave-dividing channels.

As the portions of the electromagnetic waves reach wave-directing members at the first end of each elongated segment 204 of the waveguide channels 203, the wave-directing members may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 202 (i.e., a pocket). That recessed member may be configured to propagate a smaller fraction of the electromagnetic energy than each of the subsequent members further down the first end, which may be protruding members rather than recessed members.

Further, each subsequent member may be configured to propagate a greater fraction of the electromagnetic waves travelling down that particular elongated segment 204 at the first end than a prior member. As such, the member at the far end of the first end may be configured to propagate the highest fraction of electromagnetic waves. Each wave-directing member 206 may take various shapes with various dimensions. In other examples, more than one member none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

Figure 2B:
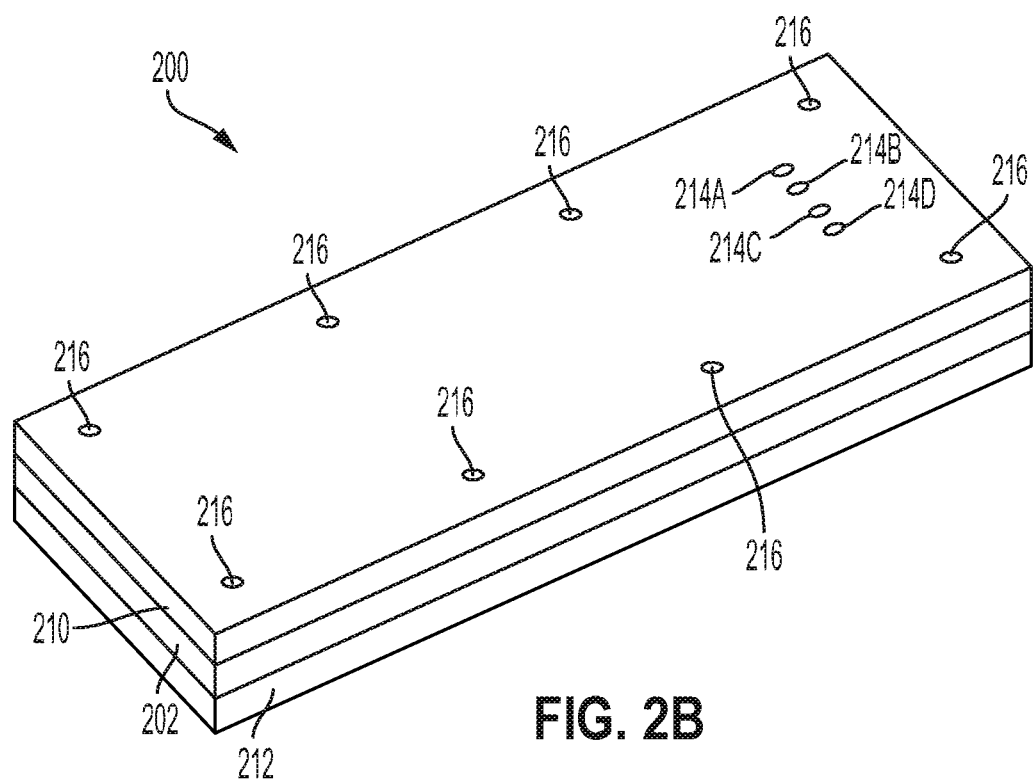
FIG. 2B illustrates another assembled view of the antenna, in accordance with example embodiments.

FIG. 2B illustrates an assembled view of the antenna 200. The antenna 200 may include the first metal layer 202, the second metal layer 210, and a third metal layer 212. The second metal layer 210 may include a plurality of holes 216 (through-holes and/or blind-holes) configured to house alignment pins, screws, and the like. The first metal layer 202 and the third metal layer 212 may include a plurality of holes as well (not shown) that are aligned with the holes 216 of the second metal layer 210.

As shown in FIG. 2B, the antenna 200 may include a set of radiating elements 214A, 214B, 214C, 214D arranged in a linear array. The quantity and arrangement of the radiating elements 214A-214D can differ within examples. In addition, the dimension of each radiating element can differ. Further, in such an example embodiment, these dimensions, in addition to or alternative to other dimensions of the example antenna 200, may be machined with no less than about a 0.51 mm error, though in other embodiments, more or less of an error may be required. Other dimensions of the OEWG array are possible as well.

In some embodiments, the first, second, and third metal layers 202, 210, 212 may be machined from aluminum plates (e.g., about 6.35 mm stock). In such embodiments, the first metal layer 202 may be at least 3 mm in thickness (e.g., about 5.84 mm to 6.86 mm). Further, the second metal layer and third metal layer 210, 212 may be machined from a 6.35 mm stock to a thickness of about 3.886 mm. Other thicknesses for layers are possible as well. Additionally, in some examples, these metal layers 202, 210, 212 may be made through a metal-plated injection molding process. In this process, the layers may be made with plastic through injection molding and coated with metal (either fully metal covered or selectively metal covered).

In some embodiments, the joining of the metal layers 202, 210, 212 may result in an air gap or other discontinuity between mating surfaces of two layers. In such embodiments, this gap or continuity should be proximate to (or perhaps as close as possible to) a center of the length of the antenna apparatus and may have a size of about 0.05 mm or smaller.

Figure 3:
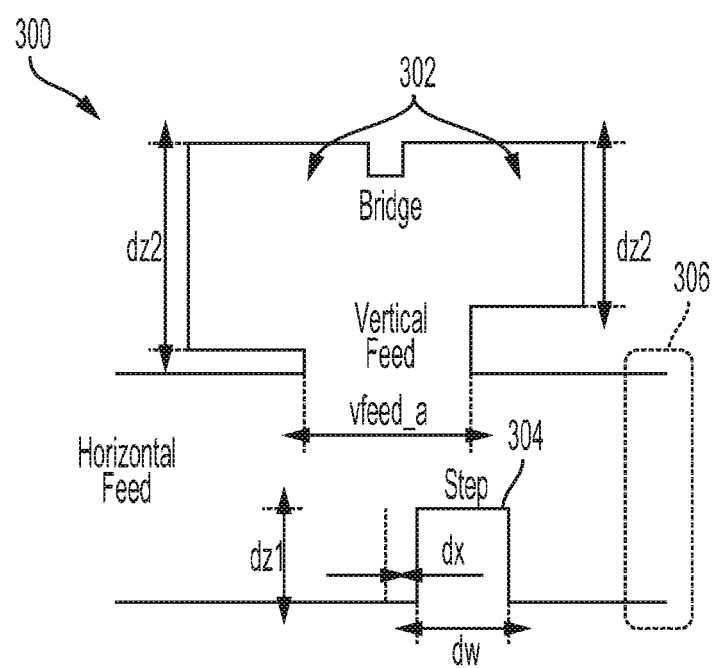
FIG. 3 illustrates a wave-radiating portion of an antenna, in accordance with example embodiments.

FIG. 3 illustrates a wave-radiating doublet of an example antenna, in accordance with an example embodiment. More specifically, FIG. 3 illustrates a cross-section of an example DOEWG 300. As noted above, a DOEWG 300 may include a horizontal feed (i.e., channel), a vertical feed (i.e. a doublet neck), and a wave-directing member 304. The vertical feed may configured to couple energy from the horizontal feed to two output ports 302, each of which is configured to radiate at least a portion of electromagnetic waves out of the DOEWG 300. The horizontal feed may be a waveguide section, such as the examples shown in FIG. 1A, FIG. 1B, and FIG. 1C.

In some embodiments, one or more DOEWG may include a backstop at location 306. Particularly, the backstop 306 may be on the left or right side depending on the DOEWG. DOEWGs that come before the last DOEWG may simply be open at location 306 and electromagnetic waves may propagate through that location 306 to subsequent DOEWGs. For example, a plurality of DOEWGs may be connected in series where the horizontal feed is common across the plurality of DOEWGs. FIG. 3 further shows various parameters that may be adjusted to tune the amplitude and/or phase of an electromagnetic signal that couples into the radiating element.

In order to tune a DOEWG such as DOEWG 300, the vertical feed width, vfeed_a, and various dimensions of the step 304 (e.g., dw, dx, and dz1) may be tuned to achieve different fractions of radiated energy out the DOEWG 300. The step 304 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 302 of the DOEWG 300 may have an associated phase and amplitude. In order to achieve the desired phase and amplitude for each output port 302, various geometry components may be adjusted. As previously discussed, the step (reflecting component) 304 may direct a portion of the electromagnetic wave through the vertical feed. In order to adjust an amplitude associated with each output port 302 of a respective DOEWG 300, a height associated with each output port 302 may be adjusted. Further, the height associated with each output port 302 could be the height or the depths of this feed section of output port 302, and not only could be a height or depth adjustment but it could be a multiplicity of these changes or steps or ascending or descending heights or depths in general.

As shown in FIG. 3, height dz2 and height dz3 may be adjusted to control the amplitude with respect to the two output ports 302. The adjustments to height dz2 and height dz3 may alter the physical dimensions of the doublet neck (e.g. vertical feed of FIG. 3A). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 302 associated with (i.e. located adjacent to) height dz2 may radiate with a greater amplitude than the amplitude of the signal radiated by the output port 302 associated with height dz3.

Further, in order to adjust the phase associated with each output port 302, steps may be introduced for each output port 302. The steps may be located on the flat sides of the output port 302 and adjust the height of dz2 and dz3 in a stepped manner. The steps in the height may cause a phase of a signal radiated by the output port 302 associated with the step to change. Thus, by controlling both the height and the steps associated with each output port 302, both the amplitude and the phase of a signal transmitted by the output port 302 may be controlled. In various examples, the steps may take various forms, such as a combination of up-steps and down-steps. Additionally, the number of steps may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

Figure 4:
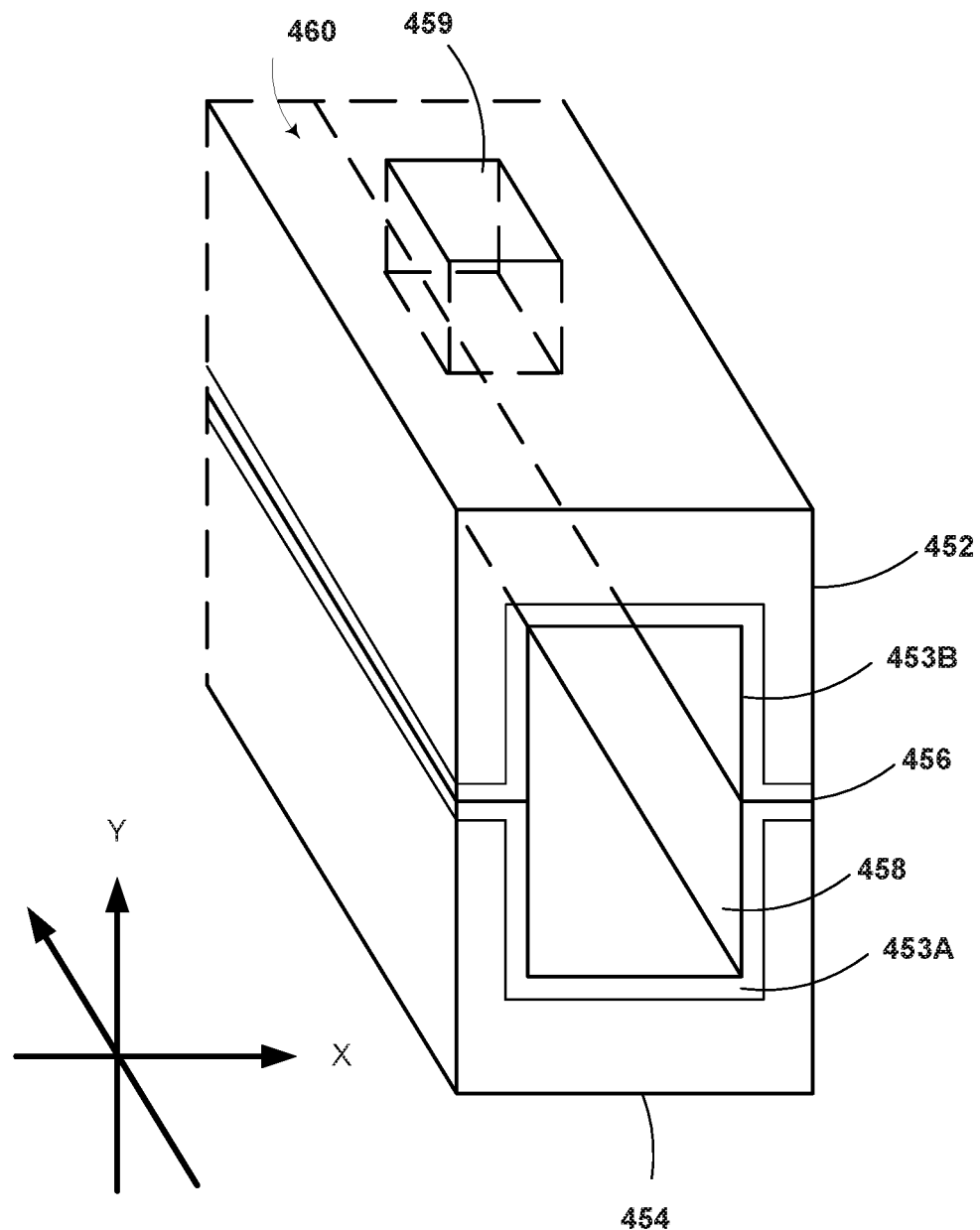
FIG. 4 illustrates a waveguide portion of the antenna, in accordance with example embodiments.

In some examples, an antenna may be constructed from a metal-plated polymer structure. The polymer may be formed through an injection molding process and coated with metal to provide the desired electromagnetic properties. FIG. 4 illustrates an example isometric cross-section view of a polymer-based waveguide 460 having a metallic portion 453A, 453B that may form the antenna described herein. The example waveguide 460 is formed with a top portion 452 and a bottom portion 454. The top portion 452 and a bottom portion 454 are coupled at seam 456. The seam 456 corresponds to a position where two layers couple together. The waveguide includes an air-filled cavity 458. Within cavity 458, electromagnetic energy propagates during the operation of waveguide 460. The waveguide 460 may also include a feed 459. Feed 459 can be used to provide electromagnetic energy to cavity 458 in waveguide 460. Alternatively or additionally, feed 459 may be used to allow electromagnetic energy to leave waveguide 450. The feed 459 may be a location where electromagnetic energy is fed into or removed from the present antenna. In other examples, the feed 459 may be a location where a waveguide receives energy from a different waveguide section of the antenna, such as the splitting or combining ports described with respect to FIGS. 1A and 1C. The example waveguide 460 of FIG. 4 features seam 456 at the middle point of the height of cavity 458. In various embodiments, the top portion 452 and a bottom portion 454 may be coupled together at various different positions along an axis of the waveguide.

As shown in FIG. 4, the top portion 452 and the bottom portion 454 may have a respective metallic portion 453A, 453B. The metallic portion 453A of the bottom portion 454 and the metallic portion 453B of the top portion 452 may each be formed through a plating process. As previously discussed, both the top portion 452 and the bottom portion 454 may be made of a polymer. The respective metallic portions 453A, 453B may be plated onto the RF surfaces, such as the internal portion of cavity 458 and the port 459. Thus, when the top portion 452 is brought into contact with the bottom portion 454, there is an electrical coupling of the respective metal portions. In the example shown in FIG. 4, only the RF surfaces (i.e., the surfaces in which electromagnetic energy come in contact) are plated. In other examples, additional surfaces beyond just the RF surfaces may be plated as well. Further, additional disclosure for a "Plated, injection Molded, Automotive Radar Waveguide Antenna" disclosed in U.S. patent application Ser. No. 15/219,423, filed Jul. 26, 2016 is hereby incorporated by reference in its entirety.

Figure 5:
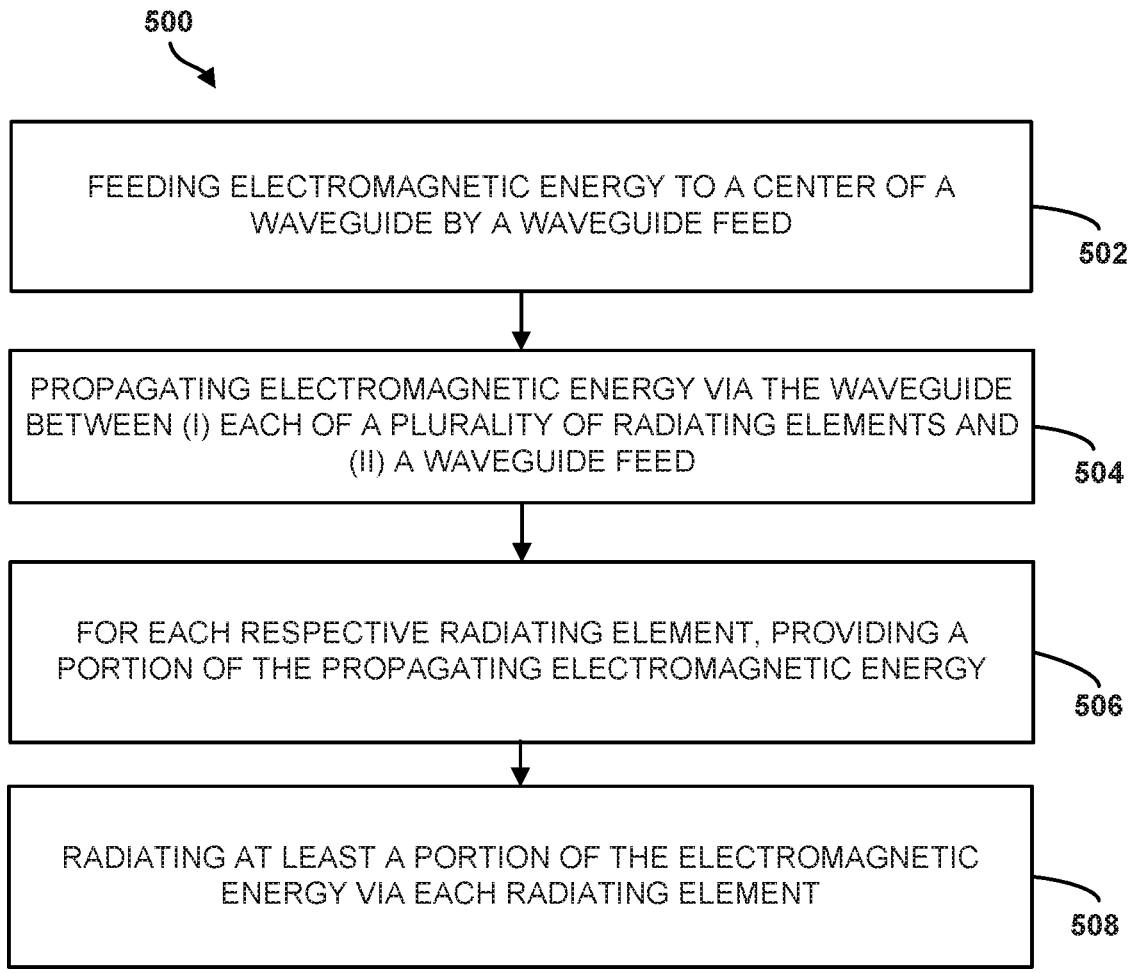
FIG. 5 is a flowchart of a method, in accordance with example embodiments.

FIG. 5 is a flowchart of an example method 500 to radiate electromagnetic energy. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate with W-band electromagnetic wave frequency of 77 GHz, which corresponds to millimeter electromagnetic wave length. At this frequency, the channels, ports, etc. of an apparatus fabricated by way of method 400 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 includes feeding electromagnetic energy to a center of a waveguide by a waveguide feed. The waveguide feed may be coupled to the second side of the waveguide at a center location between a first half of a set of radiating elements and a second half of the set of radiating elements. For instance, the waveguide feed may be coupled to the second side of the waveguide along the length dimension of the waveguide. The waveguide feed represents a waveguide capable of transferring (i.e., feeding) electromagnetic energy to the center (or another portion) of another waveguide or multiple waveguides.

In some examples, the first half of the radiating elements may include a first set of radiating doublets and a first radiating singlet. The second half of the radiating elements may include a second set of radiating doublets and a second radiating singlet. For instance, the first set of radiating doublets and the second set of radiating doublets may each include two radiating doublets.

In some antenna configurations, the first and second radiating singlets are positioned together in the center of the linear array of radiating elements, such as in the configuration shown in FIG. 1A. In such a configuration, the sets of radiating doublets are positioned outside of the radiating singlets within the linear array. In other antenna configurations, the first and second radiating singlets are positioned on the ends of the linear array of radiating elements, such as in the configuration shown in FIG. 1B and FIG. 1C. In such a configuration, the sets of radiating doublets re positioned inside the radiating singlets within the linear array.

At block 504, the method 500 includes propagating electromagnetic energy (e.g., 77 GHz millimeter electromagnetic waves) via the waveguide between (i) each of a plurality of radiating elements and (ii) a waveguide feed. The radiating elements are configured to radiate electromagnetic energy and arranged symmetrically in a linear array.

In some examples, the geometry of the waveguide may include a height dimension and a length dimension such that the first and second sides of the waveguide are orthogonal to the height dimension and parallel to the length dimension. As such, the radiating elements may be coupled to the first side of the waveguide. For example, a waveguide may have a straight shape and the radiating elements may be aligned along the length of the waveguide.

At block 506, the method 500 includes, for each respective radiating element, providing a portion of the propagating electromagnetic energy. For example, the electromagnetic energy from the waveguide feed may be divided based on a taper profile. Particularly, each radiating element of the plurality of radiating elements may receive a portion of the electromagnetic energy based on the taper profile.

In some examples, the electromagnetic energy is divided evenly. In other examples, dividing the electromagnetic energy from the waveguide feed based on a taper profile unevenly divides the power from the waveguide feed. In further examples, dividing the electromagnetic energy from the waveguide feed further involves a beamforming network dividing the electromagnetic energy to a plurality of waveguides.

At block 508, the method 500 includes radiating at least a portion of the coupled electromagnetic energy via each radiating element. Each radiating element radiates a portion of the coupled electromagnetic energy based on an associated amplitude and phase for each respective radiating element defined by the taper profile.

Figure 6:
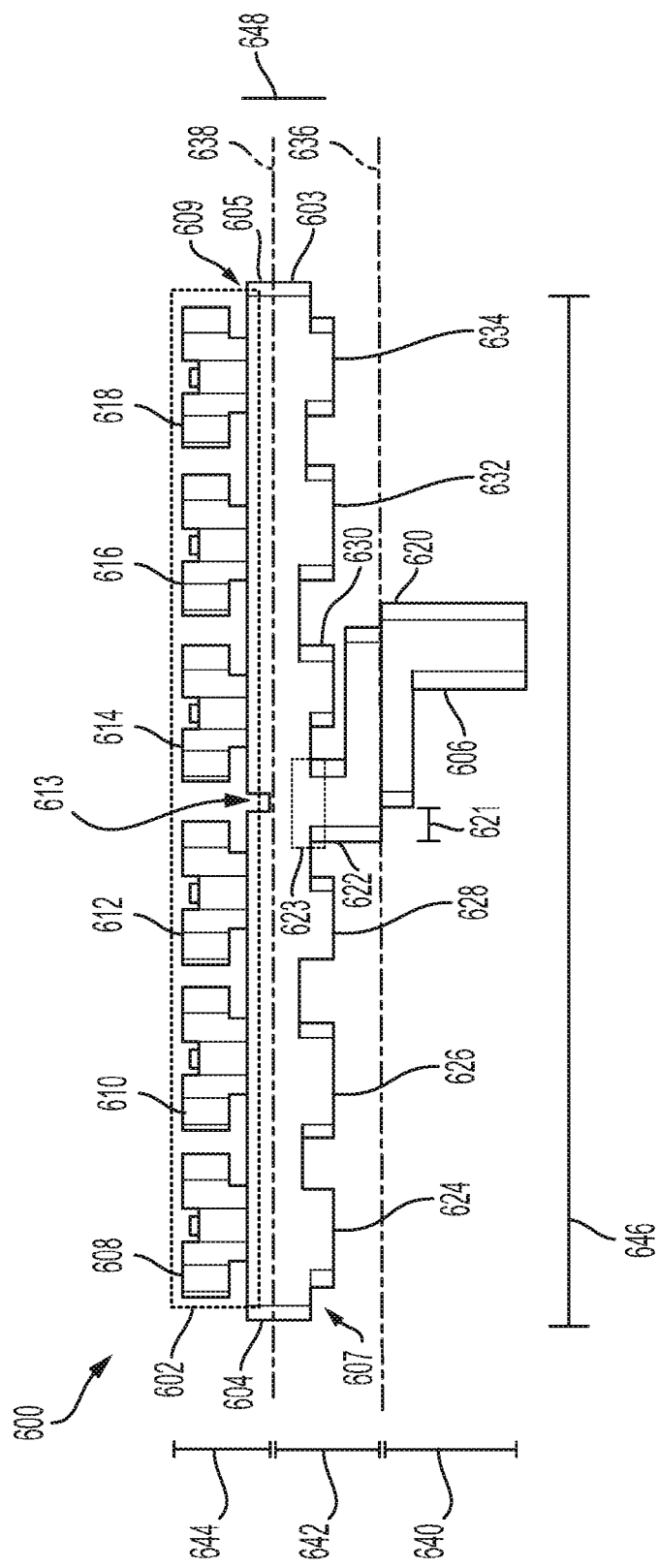
FIG. 6 illustrates a three layer center-fed antenna configuration, in accordance with example embodiments.

FIG. 6 illustrates a three layer center-fed antenna configuration, in accordance with example embodiments. As shown in the three layer center-fed antenna configuration, the antenna 600 includes a set of radiating elements 602, a waveguide 604, and a feed waveguide 606. In other configurations, the antenna 600 can have other elements, such as more or fewer radiating elements.

The antenna 600 represents an antenna configuration that utilizes a feed waveguide 606 positioned center relative the waveguide 604 and the set of radiating elements 602 (i.e., at a central alignment relative to the linear array of radiating elements 602). As such, the feed waveguide 606 may connect to a feed port that supplies electromagnetic energy to or from an element (such as a radar chip or another external component) located outside of the antenna. The electromagnetic energy propagates through the feed waveguide 606 into waveguide 604 to each of the set of radiating elements 602 in a symmetrical distribution. This type of distribution can enable balanced performance of the set of radiating elements 602.

The set of radiating elements 602 are shown with the radiating elements 608, 610, 612, 614, 616, and 618. These radiating elements 608-618 are shown arranged in a linear array along a top surface of the waveguide 604. Particularly, each radiating element 608-618 (or a subset of the radiating elements 608-618) may radiate electromagnetic energy received from the waveguide 604 as radar signals into the environment of the antenna 600. In addition, one or more of the radiating elements 608-618 may receive radar signals that reflected off one or more surfaces in the environment and back towards the antenna 600. The radiating elements 608-618 are shown as radiating doublets, but can have other configurations within examples (e.g., singlets, triplets) similar to other antenna configurations described herein.

As shown in FIG. 6, the antenna 600 may include multiple layers, such as a first layer 640, a second layer 642, and a third layer 644. These layers may be made out of various materials, such as one or more types of metal. For instance, the layers may be generated using a CNC process. When two of the layers are coupled together, the plane at which the two layers couple together forms a seam. For instance, the first layer 640 and the second layer 642 are shown coupled together forming seam 636 and the second layer 642 and the third layer 644 are coupled together forming seam 638. Seams 636-638 may represent the junction between different layers of the antenna 600. Although three layers are shown for the antenna 600, other embodiments may include more or fewer layers. For instance, another example antenna may be configured with four layers. In some examples, each of the first layer 640, the second layer 642, and the third layer 644 are made from machined metal. As such, the waveguide 604 may be air filled.

The first layer 640 includes a first portion 620 of the feed waveguide 606. The first portion 620 may be machined as part of the first layer 640. As shown, the first portion 620 of the feed waveguide 606 is coupled to the second portion 622 of the feed waveguide 606 creating a seam 636. As shown, the feed waveguide 606 forms a structure that is coupled to a first waveguide portion 620 that causes propagation of electromagnetic energy in a direction parallel to the set of radiating elements 602 within the horizontal waveguide including the first portion 620.

In the example shown in FIG. 6, the first portion 620 is coupled to the second portion 622 of the feed waveguide 606 such that an alignment of the first portion 620 and the second portion 622 includes an offset 621. The offset 621 may influence the propagation of electromagnetic energy in the feed waveguide 606, such as impedance matching or phase adjustment. As such, the size of the offset 621 may vary depending on the desired impact on the electromagnetic energy transferred within the feed waveguide 606 to and from the waveguide 604.

When the second layer 642 and the third layer 644 are coupled together, the waveguide 604 is formed. Particularly, the second layer 642 includes a first portion 603 of the waveguide 604 and the third layer 644 includes a second portion 605 of the waveguide 604. Thus, when the second layer 642 and the third layer 644 are coupled together, the waveguide 604 is formed by the coupling of the first portion 603 and the second portion 605. This coupling creates a seam 638 that extends along a center of the waveguide 604. The waveguide 604 may be an air-filled waveguide and may further split and combine electromagnetic energy. Particularly, the combination of the second layer 642 and the third layer 644 may form a beamforming network.

The third layer 644 further includes a set of radiating elements 602. The set of radiating elements 602 are shown in a linear array. In other examples, the set of radiating elements 602 may be arranged differently, such as another two dimensional (2D) or three dimensional (3D) array.

The waveguide 604 is configured to guide electromagnetic energy between the set of radiating elements 602 and the feed waveguide 606. As shown in FIG. 6, the waveguide includes a first side 609 and a second side 607 opposite the first side 609. Particularly, the first side 609 and the second side 607 are orthogonal to a height dimension 648 of the waveguide 604 and parallel to a length dimension 646 of the waveguide 604. As such, the set of radiating elements 602 are shown coupled to the first side 609 of the waveguide 604.

The feed waveguide 606 is shown coupled to the second side 607 of the waveguide 604. In particular, the second portion 622 of the feed waveguide 606 is coupled to the second portion 605 of the waveguide 604 at a coupling point 623. As shown in FIG. 6, the coupling point 623 aligns with a center 613 of the linear array of radiating elements 602. With the center alignment between the feed waveguide 606 relative to the center 613 of the linear array, the feed waveguide 606 and the waveguide 604 may transfer electromagnetic energy symmetrically to each radiating element 608-618. Thus, unlike an end-fed antenna that utilizes a feed waveguide coupled to an end of the waveguide, the central position of the feed waveguide 606 may help propagate and distribute electromagnetic energy uniformly to the radiating elements 608-618.

During operation of the antenna 600, the feed waveguide 606 transfers electromagnetic energy between the waveguide 604 and a component external to the waveguide 604 (e.g., a radar chipset that provides and receives radar signals in the form of electromagnetic energy). In some embodiments, the feed waveguide 606 may serve to direct energy one way from the feed port to the waveguide 604. In other embodiments, the feed waveguide 606 is configured to serve as a two-way component that can direct energy both ways between the waveguide 604 and the external component (e.g., the feed port, a radar chip). For example, the feed waveguide 606 may be coupled to a beamforming network. The beamforming network may couple to multiple waveguides (e.g., the waveguide 604) and each waveguide may further link to one or more radiating elements. Therefore, in some examples, multiple sets of radiating elements 602 may form a 2D array and the feed waveguide 606 may provide electromagnetic energy for multiple waveguides, like the waveguide 604, that each have a set of radiating elements coupled thereto.

In some examples, the feed waveguide 606 may couple to the waveguide 604 at a junction. Particularly, the junction may be configured to divide power based on geometry of the feed waveguide 606 and the waveguide 604.

In some embodiments, the antenna 600 may include one or more dips the dips 624, 626, 628, 630, 632, and 634) under the waveguide 604 (e.g., the second side 607 of the waveguide 604) and relative to the feed waveguide 606 that can assist with directing energy towards various radiating elements. The dips 624-634 may differ in structure, design, and placement within examples. Further, the antenna 600 may not include the dips at all in other embodiments.

The antenna 600 may further include components not shown in FIG. 6. For instance, the antenna 600 may include a power dividing network located in a plane defined by one of the seams and configured to divide the electromagnetic energy transferred by the feed waveguide 606 based on a taper profile. Each radiating element 608-618 may receive a portion of the electromagnetic energy based on the taper profile. In some examples, the power dividing network may unevenly divide the power from the feed waveguide 606. In other examples, the power dividing network may evenly divide the power from the feed waveguide 606.

Figure 7:
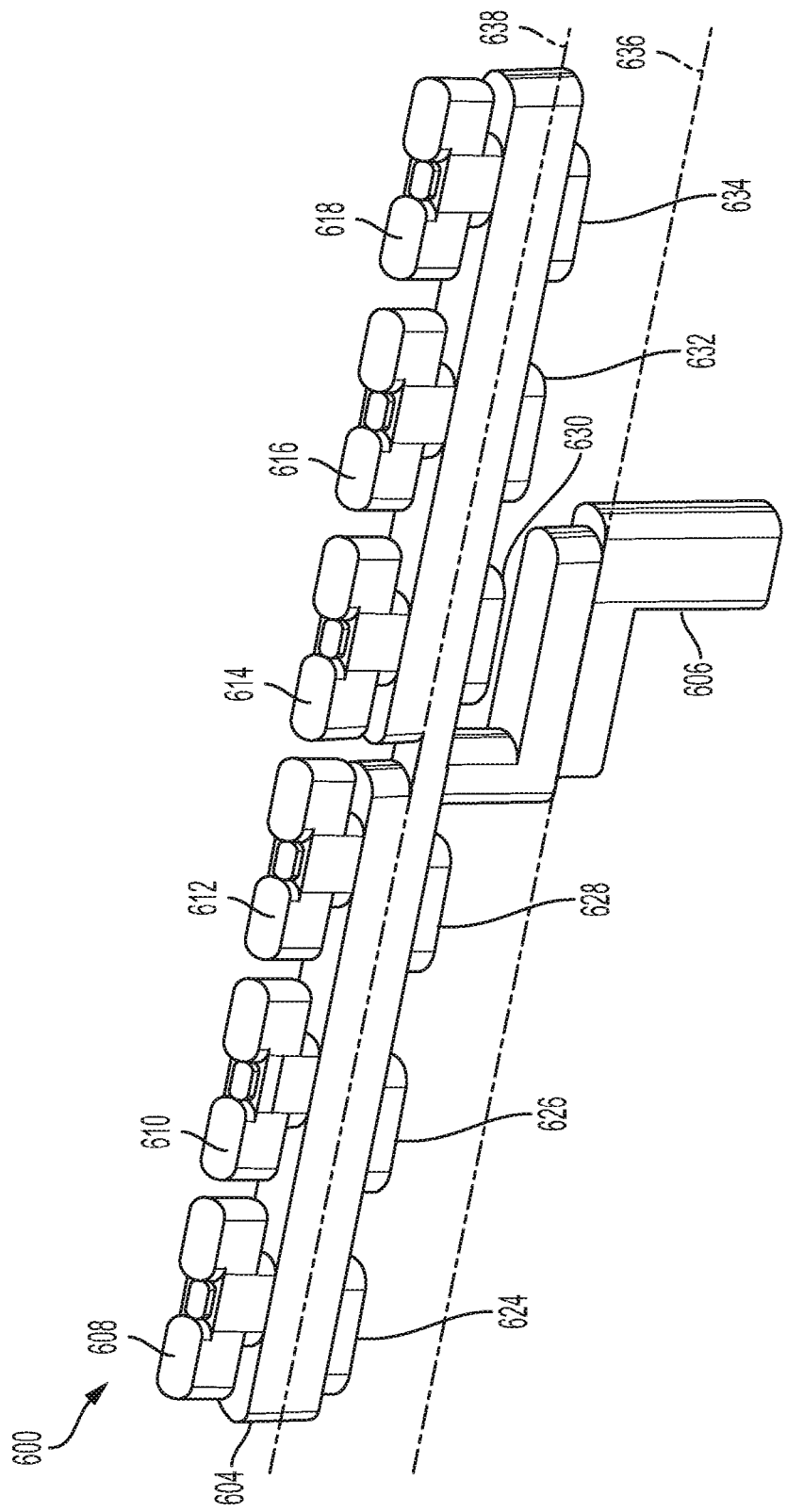
FIG. 7 illustrates a three-dimensional rendering of the three layer center-fed antenna configuration illustrated in FIG. 6, in accordance with example embodiments.

FIG. 7 illustrates a three-dimensional rendering of the three layer center-fed antenna configuration illustrated in FIG. 6, in accordance with example embodiments. As shown in the center fed configuration, the antenna 600 includes a set of radiating elements, a waveguide 604, and a feed waveguide 606. As indicated above, this configuration may be desirable to enable particular operation by the antenna 600 with respect to a taper profile.

The waveguide 604 may be configured in a similar manner as the waveguides discussed throughout this disclosure. For example, the waveguide 604 may include various shapes and structures configured to direct electromagnetic power to the various radiating elements. Particularly, a portion of electromagnetic waves propagating through waveguide 604 may be divided and directed by various recessed wave-directing members and raised wave-directing members.

The pattern of wave-directing members shown in FIG. 7 is one example for the wave-directing members 624-634. Based on the specific implementation, the wave-directing members may have different sizes, shapes, and locations. Additionally, the waveguide may be designed to have the waveguide ends to be tuned shorts. For example, the geometry of the ends of the waveguides may be adjusted so the waveguide ends act as tuned shorts to prevent reflections of electromagnetic energy within the waveguide 604.

At each junction of respective radiating elements of the waveguide 604, the junction may be considered a two way power divider. A percentage of the electromagnetic power may couple into the neck of the respective radiating elements and the remaining electromagnetic power may continue to propagate down the waveguide 604. By adjusting the various parameters neck width, heights, and steps) of each respective radiating element, the respective percentage of the electromagnetic power may be controlled. Thus, the geometry of each respective radiating element may be controlled in order to achieve the desired power taper. Thus, by adjusting the geometry of each of the offset feed and each respective radiating element, the desired phase and power taper for a respective waveguide and its associated radiating elements may be achieved.

When the system is being used in a transmission mode, electromagnetic energy may be injected into the waveguide 604 via the feed waveguide 606. The feed waveguide 606 may couple to a port (i.e. a through hole) in a bottom metal layer. The feed waveguide 606 may serve as a linking waveguide that enables electromagnetic energy to transfer into the waveguide 604. As such, an electromagnetic signal may be coupled from outside the antenna 600 into the waveguide 604 through the feed waveguide 606. The electromagnetic signal may come from a component located outside the antenna unit, such as a printed circuit board, another waveguide, a radar chip, or other signal source. In some examples, the feed waveguide 606 may be coupled to another dividing network of waveguides.

When the system is being used in a reception mode, the various radiating elements may be configured to receive electromagnetic energy from the outside world. In these examples, the feed waveguide 606 may be used to remove electromagnetic energy from the waveguide 604. When electromagnetic energy is removed from the waveguide 604, it may be coupled into one or more external components (e.g., one or more radar chips) for further processing.

In the example shown in FIG. 7, the feed waveguide 606 is located at a location (e.g., a center coupling point) that aligns with a center of the symmetrical linear array of radiating elements. By centrally locating the feed waveguide 606, the electromagnetic energy that couples into the waveguide 604 may be divided more easily. Further, by locating the feed waveguide 606 at a central position, an antenna unit may be designed in a more compact manner relative to an end-fed antenna unit.

When electromagnetic energy enters the waveguide 604 from the feed waveguide 606, the electromagnetic energy may be split in order to achieve a desired radiation pattern. For example, it may be desirable for each of a series of radiating elements in the linear array to receive a predetermined percentage of the electromagnetic energy from the waveguide 604. The waveguide may include a power dividing element (not shown) that is configured to split the electromagnetic energy that travels down each side of the waveguide.

In some examples, the power dividing element may cause the power to be divided evenly or unevenly. One or more of the set of radiating elements 602 may be configured to radiate the electromagnetic energy upon reception of a portion of the electromagnetic energy. In some examples, each radiating element may receive approximately the same percentage of the electromagnetic energy as each other radiating element. In other examples, each radiating element may receive a percentage of the electromagnetic energy based on a taper profile.

In some example taper profiles, the radiating elements 608-618 of the antenna 600 that are located closer to the center of the waveguide 604 relative to the feed waveguide 606 may receive a higher percentage of the electromagnetic energy. If electromagnetic energy is injected into the end of the waveguide, it may be more difficult to design the waveguide to correctly split power between the various radiating elements. By locating the feed waveguide 606 at the central position, a more natural power division between the various radiating elements may be achieved.

In some examples, the radiating elements may have an associated taper profile that specifies the radiating elements in the center should receive a higher percentage of the electromagnetic energy than the other elements. Because the feed waveguide 606 is located closer to the center elements (e.g., radiating elements 612, 614), it may be more natural to divide power with elements closest to the feed waveguide 606 receiving higher power. Further, if the waveguide 604 has the feed waveguide 606 located at the center of the waveguide 604, the waveguide 604 may be designed in a symmetrical manner to achieve the desired power division.

Figure 8:
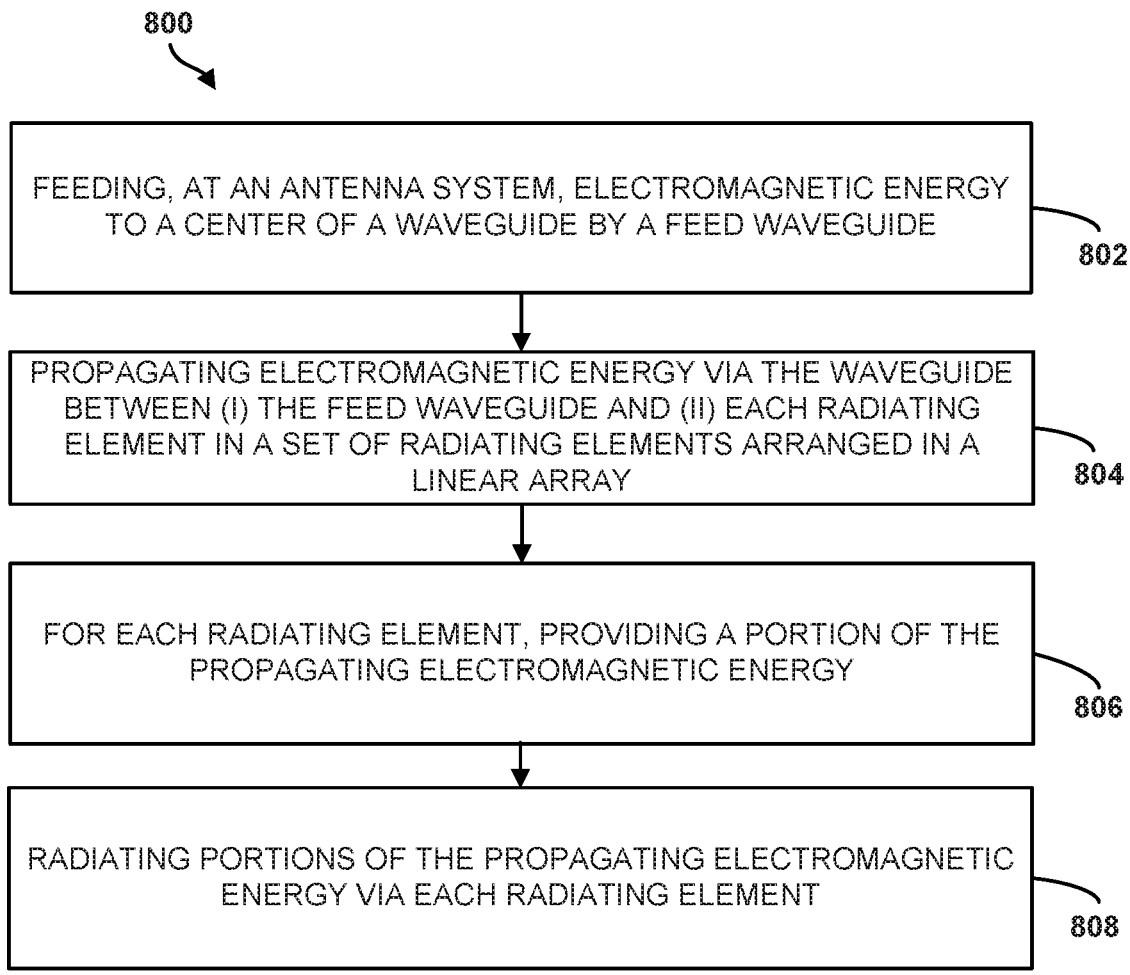
FIG. 8 is a flowchart of a method, in accordance with example embodiments.

FIG. 8 is a flowchart of an example method 800 to radiate electromagnetic energy. It should be understood that other methods of operation not described herein are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 802, the method 800 includes feeding, at an antenna system, electromagnetic energy to a center of a waveguide by a feed waveguide. In some examples, a first layer of the antenna system includes a first portion of the feed waveguide coupled to a feed port.

At block 804, the method 800 includes propagating electromagnetic energy (e.g., 77 GHz millimeter electromagnetic waves) via the waveguide between (i) the feed waveguide and (ii) each radiating element in a set of radiating elements arranged in a linear array. In some examples, a second layer of the antenna system includes a second portion of the feed waveguide and a first portion of the waveguide. The first portion of the feed waveguide is coupled to the second portion of the feed waveguide such that the feed waveguide causes propagation of electromagnetic energy in a direction parallel to a seam between the first layer and the second layer. In addition, the second portion of the feed waveguide is coupled to the first portion of the waveguide at a coupling point. For example, the antenna system may resemble the antenna configuration 600 shown in FIGS. 6 and 7.

In some examples, the set of radiating elements are arranged in the linear array and may include a first subset of radiating elements extending a first direction from the center of the linear array and a second subset of radiating elements extending a second direction from the center of the linear array. For instance, a first quantity of radiating elements in the first subset of radiating elements equals a second quantity of radiating elements in the second subset of radiating elements. The linear array may also include other arrangements and quantities of radiating elements.

At block 806, the method 800 includes, for each radiating element, providing a portion of the propagating electromagnetic energy. For example, the electromagnetic energy from the waveguide feed may be divided based on a taper profile. Particularly, each radiating element of the plurality of radiating elements may receive a portion of the electromagnetic energy based on the taper profile.

In some examples, the electromagnetic energy is divided evenly. In other examples, dividing the electromagnetic energy from the waveguide feed based on a taper profile unevenly divides the power from the waveguide feed. In further examples, dividing the electromagnetic energy from the waveguide feed further involves a beamforming network dividing the electromagnetic energy to a plurality of waveguides.

In some examples, a third layer of the antenna system includes a second portion of the waveguide and the set of radiating elements arranged in the linear array. Each radiating element is coupled to the second portion of the waveguide and the coupling point aligns with a center of the linear array.

At block 808, the method 800 includes radiating portions of the coupled electromagnetic energy via each radiating element. Each radiating element radiates a portion of the coupled electromagnetic energy based on an associated amplitude and phase for each respective radiating element defined by the taper profile.

Figure 9:
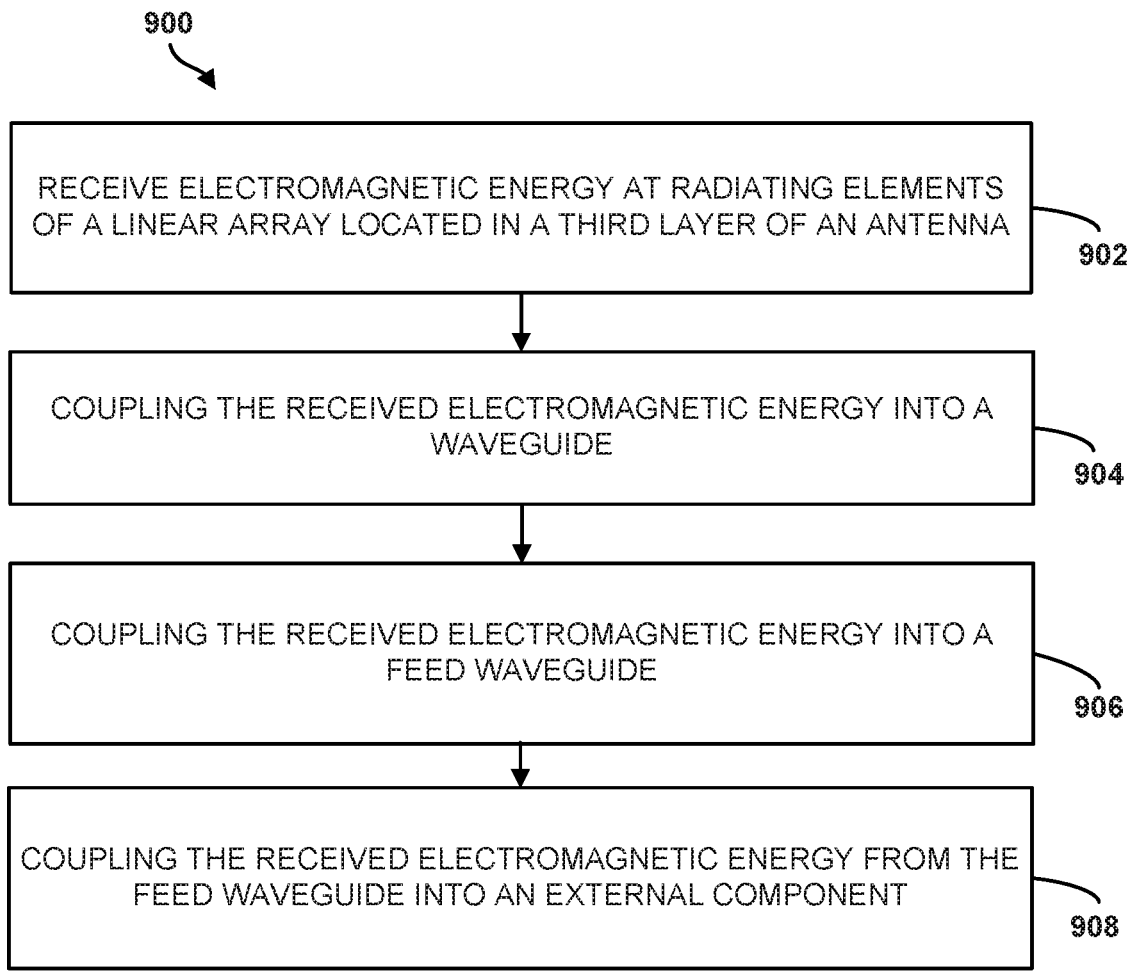
FIG. 9 is a flowchart of another method, in accordance with example embodiments.

FIG. 9 is a flowchart of an example method 900 to receive electromagnetic energy. It should be understood that other methods of operation not described herein are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 902, the method 900 may involve receiving electromagnetic energy at radiating elements of a linear array located in a third layer of an antenna. For example, an antenna may include multiple layers and the third layer may include a set of radiating elements similar to the antenna configuration illustrated in FIGS. 6 and 7. One or more radiating elements may receive electromagnetic energy that corresponds to reflections of radar signals that reflected off a surface in the environment of the antenna.

At block 904, the method 900 may involve coupling the received electromagnetic energy into a waveguide. In some examples, the antenna may be configured such that a first portion of the waveguide is in a second layer of the antenna and a second portion of the waveguide is in the third layer of the antenna.

At block 906, the method 900 may involve coupling at least a portion of the received electromagnetic energy into a feed waveguide. The antenna configuration may include a first portion of the feed waveguide in a first layer of the antenna and a second portion of the feed waveguide coupled to the first portion of the waveguide at a coupling point in the second layer of the antenna. Particularly, the first portion of the feed waveguide may be coupled to the second portion of the feed waveguide such that the feed waveguide causes propagation of electromagnetic energy in a direction parallel to a seam between the first layer and the second layer of the antenna. The coupling point of the second layer may be in alignment with a center of the linear array.

At block 908, the method 900 may involve coupling the received electromagnetic energy from the feed waveguide to an external component. For instance, a portion of the electromagnetic energy may be propagated through the feed waveguide into an external component, such as a radar chip.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate with W-band electromagnetic wave frequency of 77 GHz, which corresponds to millimeter electromagnetic wave length. At this frequency, the channels, ports, etc. of an apparatus fabricated by way of method 400 may be of given dimensions appropriated for the 77 GHz frequency. Other example antennas and antenna applications are possible as well.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An antenna system comprising:
    a first layer having a first portion of a feed waveguide coupled to a feed port;
    a second layer having a second portion of the feed waveguide and a first portion of a waveguide, wherein the first portion of the feed waveguide is coupled to the second portion of the feed waveguide such that the feed waveguide causes propagation of electromagnetic energy in a direction parallel to a seam between the first layer and the second layer, and wherein the second portion of the feed waveguide is coupled to the first portion of the waveguide at a coupling point; and
    a third layer having a second portion of the waveguide and a set of radiating elements arranged in a linear array, wherein each radiating element is coupled to the second portion of the waveguide, and wherein the coupling point of the second layer is in alignment with a center of the linear array.

2. The antenna system of claim 1, wherein the set of radiating elements arranged in the linear array comprises a first subset of radiating elements extending a first direction from the center of the linear array and a second subset of radiating elements extending a second direction from the center of the linear array.

3. The antenna system of claim 2, wherein a first quantity of radiating elements in the first subset of radiating elements equals a second quantity of radiating elements in the second subset of radiating elements.

4. The antenna system of claim 1, wherein each radiating element in the set of radiating elements is a radiating doublet.

5. The antenna system of claim 1, wherein the waveguide symmetrically divides electromagnetic energy received from the feed waveguide.

6. The antenna system of claim 1, wherein each of the first layer, the second layer, and the third layer are made from machined metal, and wherein the waveguide is air filled.

7. The antenna system of claim 1, wherein the first portion of the feed waveguide is coupled to the second portion of the feed waveguide such that an offset is in an alignment of the first portion and the second portion of the feed waveguide.

8. The antenna system of claim 1, further comprising:
    a power dividing network defined by the waveguide and configured to divide the electromagnetic energy propagated by the feed waveguide based on a taper profile, wherein each radiating element receives a portion of the electromagnetic energy based on the taper profile.

9. The antenna system of claim 1, wherein the feed waveguide is coupled to a beamforming network, wherein the beamforming network is coupled to a plurality of respective waveguides and each waveguide includes a plurality of radiating elements.

10. The antenna system of claim 1, wherein the feed waveguide is coupled to the waveguide at a junction, and wherein the junction is configured to divide power based on geometry of at least one of the feed waveguide and the waveguide.

11. A method of radiating a radar signal comprising:
    feeding, at an antenna system, electromagnetic energy to a center of a waveguide by a feed waveguide, wherein a first layer of the antenna system includes a first portion of the feed waveguide coupled to a feed port;
    propagating electromagnetic energy via the waveguide between (i) the feed waveguide and (ii) each radiating element in a set of radiating elements arranged in a linear array, wherein a second layer of the antenna system includes a second portion of the feed waveguide and a first portion of the waveguide, wherein the first portion of the feed waveguide is coupled to the second portion of the feed waveguide such that the feed waveguide causes propagation of electromagnetic energy in a direction parallel to a seam between the first layer and the second layer, and wherein the second portion of the feed waveguide is coupled to the first portion of the waveguide at a coupling point;
    for each radiating element, providing a portion of the propagating electromagnetic energy, wherein a third layer of the antenna system includes a second portion of the waveguide and the set of radiating elements arranged in the linear array, wherein each radiating element is coupled to the second portion of the waveguide, and wherein the coupling point is in alignment with a center of the linear array; and
    radiating portions of the propagating electromagnetic energy via each radiating element.

12. The method of claim 11, wherein the set of radiating elements arranged in the linear array comprises a first subset of radiating elements extending a first direction from the center of the linear array and a second subset of radiating elements extending a second direction from the center of the linear array.

13. The method of claim 12, wherein a first quantity of radiating elements in the first subset of radiating elements equals a second quantity of radiating elements in the second subset of radiating elements.

14. The method of claim 11, wherein each radiating element in the set of radiating elements is a radiating doublet.

15. The method of claim 11, wherein each of the first layer, the second layer, and the third layer are made from machined metal, and wherein the waveguide is air filled.

16. The method of claim 11, wherein the first portion of the feed waveguide is coupled to the second portion of the feed waveguide such that an offset is in an alignment of the first portion and the second portion of the feed waveguide.

17. The method of claim 11, wherein for each radiating element, providing the portion of the propagating electromagnetic energy comprises:
dividing the electromagnetic energy from the feed waveguide based on a taper profile, wherein each radiating element receives a portion of the electromagnetic energy based on the taper profile.

18. The method of claim 17, wherein dividing electromagnetic energy from the feed waveguide further comprises a beamforming network dividing the electromagnetic energy to a plurality of waveguides.

19. A method of receiving a radar signal comprising:
receiving electromagnetic energy at one or more radiating elements of a linear array located in a third layer of an antenna;
coupling the received electromagnetic energy into a waveguide, wherein a first portion of the waveguide is in a second layer of the antenna and a second portion of the waveguide is in the third layer of the antenna;
coupling at least a portion of the received electromagnetic energy into a feed waveguide, wherein a first portion of the feed waveguide is in a first layer of the antenna and a second portion of the feed waveguide is coupled to the first portion of the waveguide at a coupling point in the second layer of the antenna, wherein the first portion of the feed waveguide is coupled to the second portion of the feed waveguide such that the feed waveguide causes propagation of electromagnetic energy in a direction parallel to a seam between the first layer and the second layer of the antenna, and wherein the coupling point of the second layer is in alignment with a center of the linear array; and
coupling the at least the portion of the received electromagnetic energy from the feed waveguide to an external component.

20. The method of receiving the radar signal of claim 19, wherein the first portion of the feed waveguide is coupled to the second portion of the feed waveguide such that an offset is in an alignment of the first portion and the second portion of the feed waveguide.

* * * * *